April 5, 1927.  
L. E. KOLLOCK  
PIPE JOINT FILLING SPOUT  
Filed Dec. 15, 1925
1,623,058
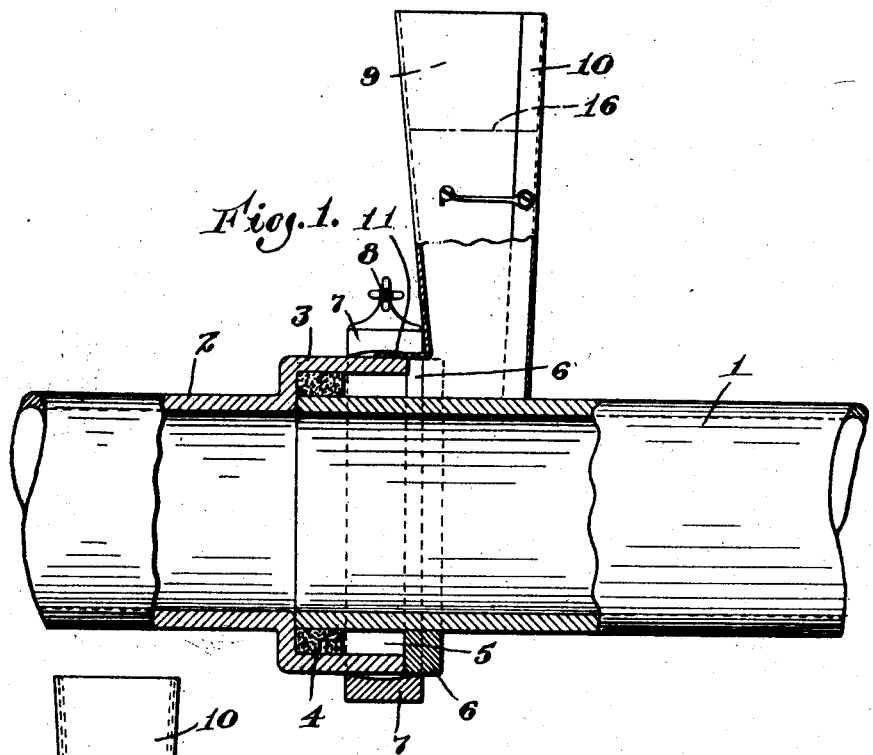
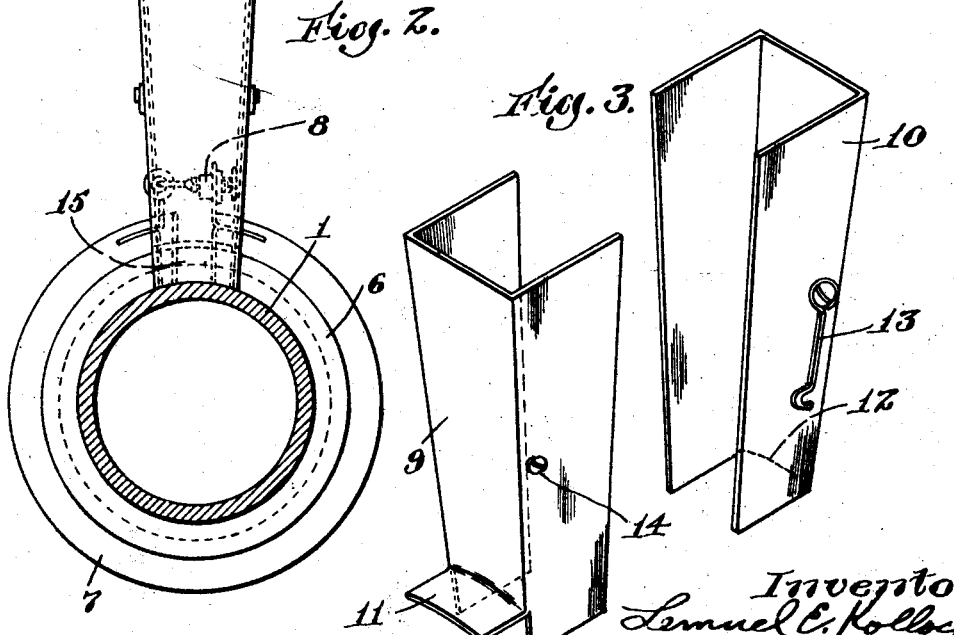
Inventor  
Lemuel E. Kollock  
by James R. Hodds  
Attorney Patented Apr. 5, 1927.

1,623,058

UNITED STATES PATENT OFFICE.

LEMUEL E. KOLLOCK, OF BOSTON, MASSACHUSETTS.

PIPE-JOINT FILLING SPOUT.

Application filed December 15, 1925. Serial No. 75,583.

My present invention is an improved process of joining and caulking pipe ends, one of which is formed with a bell or hub at one end, into which is fitted the adjacent end of the other pipe, and includes a novel, sectional and separable filler spout therefor.

In carrying out my present invention, I utilize a separable filler spout, comprising two interlocking sections and means to secure these sections together when in operation. One of these sections is provided with an arcuate lip adapted to fit a portion of the bell of one pipe, the bottom of this section and one of the other section being adapted to rest upon the male pipe.

My present novel process of caulking pipe joints may be utilized with water pipes, water mains, gas pipes or the like, where a tight, non-leaking joint is requisite, and is carried out as follows:

The male pipe is fitted into the bell end of the abutting pipe, and a preliminary caulking of oakum, hemp or the like applied. Then a detachable and adjustable runner is applied, which can be convolutely secured around the inserted or male pipe in contact with the end of the bell to prevent loss of the caulking material which is run into the space around the inserted pipe and within the bell. My novel filling spout is applied to the pipe and held in place by the runner and clamp, preferably of the type illustrated in my prior Patent No. 1,544,763. The caulking or sealing material, such as lead, is then poured into the spout to a predeterminedly sufficient height so that the flow of the sealing metal through the sprue opening will be accentuated, thus causing a quicker flow of the metal to the lowermost portions of the recess to be filled, before the metal cools, and also the weight of the metal in the spout, above the level to be filled, will act as a positive forcing element for insuring a complete filling of the pipe joint recess. Upon cooling and hardening of the metal, the runner is removed, the sections of my novel spout separated and the superfluous metal left by the spout and sprue opening is then removed by a sharp blow by a chisel, hammer or the like, and the joint is now sealed and completed.

I believe that my novel process of sealing and caulking joints is new, and I desire to claim the same broadly herein.

I also believe that my sectional and separable filler spout is new, and I desire to claim the same herein also.

Further features of the invention, advantages and details, will be hereinafter more fully pointed out and claimed.

Referring to the drawings, illustrating a preferred embodiment of my present invention, Fig. 1 is a sectional side view of a pipe joint with my novel spout and runner in position;

Fig. 2 is an end elevation of the same, with the pipe in cross-section; and

Fig. 3 is a detailed view of my novel sectional spout.

As shown in the drawings, a pipe 1 is fitted into the bell 3 of a pipe 2. A preliminary packing or caulking 4 of oakum, hemp or the like is packed and forced into the joint between the two pipes, leaving the space or annular recess 5 to be subsequently filled with molten metal.

A suitable runner 6 is then applied around the pipe, abutting against the outer end of the bell 3, whereupon a clamp 7 is fitted around both the bell 3 and runner 6, to hold the runner in firm engagement against the mouth of the bell. The clamp 7 is secured together, preferably at the top of the bell, by any suitable or desirable clamping means 8, preferably such as illustrated and described in my said prior patent.

Before tightening the clamp 7, my novel filling spout is applied, this spout comprising two sections 9 and 10, the section 9 having an arcuate lip 11 thereon, which lip is inserted under and caught by the clamp 7, and is held in firm position thereby. The arcuate lip 11 is so formed that it will have a tight seat upon the bell 3.

Fig. 3 illustrates in detail my novel sectional filling spout, comprising the sections 9 and 10. The arcuate lip 11 is clearly shown. The bottom edge 12 of the section 10 is also curved in shape, to permit an even seat on the pipe 1. A pivoted hook 13 is provided on the section 10, adapted to engage with a catch 14 on the section 9 to hold the two sections in interlocking engagement. It will be appreciated that I have shown this hook and catch for illustrative purposes merely, and that any holding, engaging or locking means can be utilized with equal facility under my invention. When the runner 6, clamp 7, and filling spout are all in position, a sprue opening 15 is left as indicated in Fig. 2, to permit the entrance of the molten lead or other caulking material utilized in sealing the joint.

With the runner, clamp and filling spout thus assembled in position on the pipe, and the preliminary caulking material having been inserted, the sealing metal is then poured into the open mouth of the filling spout, until the metal in the spout reaches a height sufficiently above the sprue opening to insure a positive flow of the caulking metal into and through the recess 5, the weight of the superfluous material in the filling spout forcing the caulking material downwardly through the sprue opening 15 and into and through the recess 5. This height of superfluous metal may be varied at will, according to the size of the recess or opening to be caulked, and I have shown at 16 the height to which the superfluous metal would probably be poured into the spout. This forcing of the caulking metal downwardly insures a quick flow of the metal into the joint, assuring filling of the same before the caulking metal has had time to cool or harden. When the metal has cooled and hardened, the clamping member 8 is loosened, the two sections 9 and 10 separated, clamp 7 and runner 6 removed, and the superfluous metal left by the spout and sprue opening cut off, preferably by a chisel inserted between the edge of the bell and the superfluous metal, and the metal then cut or knocked off. This superfluous metal can be removed by a hammer blow or in any other way, but preferably by a chisel, to leave a clean line of cut and a clean joint, and this metal can then be re-used.

While I have necessarily described my invention somewhat in detail, it will be appreciated that I am not limited thereto, but may vary the size, shape and arrangement of parts within reasonably wide limits without departing from the spirit of the invention.

My invention is further described and defined in the form of claim as follows:

A sectional spout for use in filling pipe joints, comprising two separable sections of substantially the same contour and of a size adapted to interlock when in engagement, one of said sections having an arcuate lip adapted to snugly fit on the bell end of one pipe, the other section having one of its bottom edges formed arcuate for snug fitting upon the adjacent pipe, and fastening means on each side of each of said sections to hold said sections in firm interlocking engagement and permitting, when released, complete separation of said two sections.

In testimony whereof, I have signed my name to this specification.

LEMUEL E. KOLLOCK.